3,466,180
DICHROIC GLASSES
Erwin C. Hagedorn, Oregon, and Dallas P. Hall, Toledo, Ohio, assignors to Owens-Illinois, Inc., a corporation of Ohio
No Drawing. Filed Sept. 14, 1965, Ser. No. 487,323
Int. Cl. C93c 3/04
U.S. Cl. 106—52                                5 Claims

ABSTRACT OF THE DISCLOSURE

Dichroic soda lime glass compositions containing 0.05 to 0.2% CoO, and 0.05 to 0.6% total chromium oxides present as both $Cr_2O_3$ and $CrO_3$ with the latter being 0.03 to 0.09%.

---

The present invention relates to the manufacture of glass colors in a given glass composition. More particularly, the present invention pertains to dichroic glasses.

Dichroic glasses are not very common. Dichroism, the property exhibited by certain colored, transparent glasses of showing different colors or hues, depending upon the thickness of the glass traversed, and depending upon the kind and concentration of the coloring matter, is generally associated with glasses containing one or more of the rare earths. The rare earths more commonly associated with dichroism are neodymium and praseodymium. Dichroic neodymium glasses are from blue to red in color. Praseodymium glasses are green, but the color is not distinct enough to justify its use. Mixtures of neodymium and praseodymium require high concentrations, e.g., four percent of each, and this is rather expensive. Thus, because the rare earths are very expensive, and because they do not produce distinct dichroic glasses, they have not met with any extensive use.

It will be appreciated, by those skilled in the art, that the production of dichroic glasses, made from inexpensive chemicals would be a useful advance over the production of dichroic glasses made from the expensive rare earths. Another advantage that will be appreciated is the manufacture of various glass colors with one glass composition rather than having several glass compositions to produce the same color.

Accordingly, it is an object of this invention to provide a dichroic glass that is made from inexpensive colorants and has distinct colors.

Another object of this invention is to provide various glass colors, with one glass composition rather than employing multiple glass compositions to produce the same colors.

Still another object of this invention is to produce a variety of glass colors in a given glass composition by changing either the concentration of the colorants, or the thickness of the glass through which the light passes or by changing both.

It has now been unexpectedly found that in attaining the objects of this invention, two generally inexpensive, nonrare earth colorants, namely, cobalt and chromium in glass base compositions will yield dichroic glasses.

In accordance with the present invention there are produced dichroic glasses which contain a combination of cobalt and chromium. This combination of cobalt and chromium, in soda-lime-silica glasses, yields dichroic glasses which may vary from blue to green in the thin section to purple to red in the thicker section in the same wedge-shaped sample. The dichroism achieved by the present invention is due in part to the presence of chromium, and the chromium in the batch can either be in the oxidized or reduced state. The dichroism of glasses containing a minimum amount of oxidized chromium is not as pronounced as the dichroism of glasses containing a greater amount of oxidized chromium, that is, when the final glass contains more hexavalent chromium, the instant property is more distinct.

The base glass preferably used in practicing the present invention is essentially a conventional glass of the type commonly called soda-lime-silica glass. The oxides and the range of percentages thereof may fall within the following ranges:

TABLE I

| Oxides: | Percent by wt. |
|---|---|
| $SiO_2$ | 65–75 |
| $Al_2O_3$ | 1–3 |
| CaO | 8–13 |
| MgO | 0.1–4 |
| $Na_2O$ | 11–15 |
| $K_2O$ | 0.1–2 |
| $Fe_2O_3$ | 0.03–0.05 |

Base glass compositions coming within the ranges above given can be used to produce the various compositions herein specified. The proportions of the total chromium content to the cobalt in the composition will vary usually from about 1 to 1 to 5 to 1. The total chromium range expressed as $Cr_2O_3$ may vary from 0.05% to 0.6% with the now preferred range being 0.1% to 0.4%. The hexavalent chromium content may range from about 0.03% to about 0.09%. The cobalt content may vary from about 0.05% to about 0.2%.

The following examples are typical of batches which can be used in the manufacture of dichroic glasses of the present invention. The conditions and procedures for making such molten base glasses are conventional and such conditions are well known to those skilled in the art, as exemplified in Tooley's "Handbook of Glass Manufacturing," Ogden Publishing Company, New York 36, N.Y., 1953, at page 245 in Tables IXB–I and IXB–II, and as explained on pages 242–252. The glass batches of Examples 1 to 13 were prepared at a melting temperature of from about 2700° F. to about 2780° F. for about 3½ to 4 hours. Examples 14 to 18 are frit type melts heated to about 2600° F. to about 2700° F. for 3 to 4 hours.

TABLE II

| | Theoretical composition, percent by weight | | | |
|---|---|---|---|---|
| | Examples | | | |
| Ingredient | 1 | 2 | 3 | 4 |
| $SiO_2$ | 71.69 | 71.63 | 71.76 | 71.72 |
| $Al_2O_3$ | 1.74 | 1.73 | 1.74 | 1.74 |
| CaO | 11.26 | 11.22 | 11.25 | 11.24 |
| MgO | 1.15 | 1.15 | 1.15 | 1.15 |
| $Na_2O$ | 13.30 | 13.26 | 13.29 | 13.29 |
| $K_2O$ | 0.41 | 0.51 | 0.41 | 0.41 |
| $Fe_2O_3$ | 0.15 | 0.05 | 0.05 | 0.05 |
| CoO | 0.15 | 0.15 | 0.15 | 0.15 |
| $Cr_2O_3$ | 0.15 | 0.30 | 0.20 | 0.25 |

TABLE III

| | Theoretical composition, percent by weight | | | | |
|---|---|---|---|---|---|
| | Examples | | | | |
| Ingredient | 5 | 6 | 7 | 8 | 9 |
| $SiO_2$ | 71.37 | 71.45 | 71.79 | 71.87 | 71.84 |
| $Al_2O_3$ | 1.73 | 1.73 | 1.74 | 1.75 | 1.75 |
| CaO | 11.18 | 11.18 | 11.26 | 11.29 | 11.26 |
| MgO | 1.14 | 1.14 | 1.15 | 1.15 | 1.15 |
| $Na_2O$ | 13.21 | 13.22 | 13.30 | 13.32 | 13.31 |
| $K_2O$ | 0.61 | 0.63 | 0.41 | 0.41 | 0.41 |
| $Fe_2O_3$ | 0.05 | 0.05 | 0.05 | 0.05 | 0.05 |
| CoO | 0.2 | 0.1 | 0.05 | 0.08 | 0.08 |
| $Cr_2O_3$ | 0.5 | 0.5 | 0.25 | 0.08 | 0.15 |

TABLE IV

| Ingredient | Theoretical composition, percent by weight | | | |
|---|---|---|---|---|
| | 10 | 11 | 12 | 13 |
| $SiO_2$ | 70.40 | 71.75 | 71.88 | 70.46 |
| $Al_2O_3$ | 1.38 | 1.74 | 1.74 | 1.38 |
| CaO | 11.08 | 11.29 | 11.29 | 11.08 |
| MgO | 2.96 | 1.15 | 1.15 | 2.96 |
| BaO | 0.63 | | | 0.63 |
| $Na_2O$ | 12.99 | 13.34 | 13.34 | 12.99 |
| $K_2O$ | 0.35 | 0.32 | 0.32 | 0.35 |
| $Fe_2O_3$ | 0.03 | 0.05 | 0.05 | 0.02 |
| CoO | 0.084 | 0.158 | 0.126 | 0.084 |
| $Cr_2O_3$ | 0.100 | 0.200 | 0.100 | 0.050 |

TABLE V

| Ingredient | Theoretical composition, percent by weight | | | | |
|---|---|---|---|---|---|
| | 14 | 15 | 16 | 17 | 18 |
| $SiO_2$ | 71.98 | 72.07 | 72.27 | 72.26 | 72.24 |
| $Al_2O_3$ | 1.61 | 1.61 | 1.94 | 1.94 | 1.94 |
| CaO | 12.39 | 12.39 | 9.45 | 9.45 | 9.45 |
| MgO | 0.15 | 0.15 | 3.84 | 3.84 | 3.84 |
| $Na_2O$ | 13.34 | 13.24 | 11.98 | 11.98 | 11.98 |
| $K_2O$ | 0.36 | 0.36 | 0.33 | 0.33 | 0.33 |
| $Fe_2O_3$ | 0.034 | 0.034 | 0.04 | 0.04 | 0.04 |
| CoO | 0.084 | 0.084 | 0.084 | 0.084 | 0.084 |
| $Cr_2O_3$ | 0.054 | 0.059 | 0.070 | 0.080 | 0.100 |

In the foregoing examples the chromium was added as potassium dichromate, and the total chromium is expressed as $Cr_2O_3$. A part of the specified $Cr_2O_3$ content is in the form of hexavalent chromium, as $CrO_3$. The actual $CrO_3$ content of any given batch is dependent upon the addition of the chromium to the batch as potassium dichromate, iron chromite or chromic oxide and upon the oxidation state during the melting phase.

Four individually prepared dichroic glasses corresponding to Examples 1 to 4 in Table II above were chemically analyzed for total chromium and hexavalent chromium and were found to actually contain:

| | Percent |
|---|---|
| Total chromium oxides (as $Cr_2O_3$) | 0.146 |
| Hexavalent chromium (as $CrO_3$) | 0.0376 |
| Total chromium oxides | 0.290 |
| Hexavalent chromium | 0.0813 |
| Total chromium oxides | 0.190 |
| Hexavalent chromium | 0.0522 |
| Total chromium oxides | 0.241 |
| Hexavalent chromium | 0.0813 |

Two remelts were made of the batch corresponding to Example 3. These remelts differ from the original melt in the following manner: the source of chromium in one batch was chromic oxide while in the other remelt the source of chromium was chromic oxide and in addition sea coal was added to this latter remelt to preserve the trivalent $Cr_2O_3$. These melts were analyzed for hexavalent chromium as $CrO_3$ and the remelt containing chromic oxide alone had a $CrO_3$ content of 0.0435% while the remelt containing chromic oxide and sea coal had a $CrO_3$ content of 0.0066%.

Since the analyzed values for the four representative compositions presented in this invention, supra, for $CrO_3$ vary from 0.0376% to 0.0813%, it is apparent that the remelt containing chromic oxide falls within this range. Although the value for the second remelt is very small, it is apparent that the source of chromium in the batch can either be in the oxidized or the reduced state. The dichroism was inferior for the remelt containing the smaller amount of hexavalent chromium when compared to melts which contained more hexavalent chromium.

The instant invention is of utility in the manufacture of articles of commerce, such as glass jars, bottles and other containers where the dichroism adds aesthetic effects to the article. The glasses produced by this invention can also be used to manufacture lenses and pressed glassware. Dichroic glasses, with their property of changing color with the type of illumination, colorants, concentration and thickness may also be used for making jewelry.

While the now preferred embodiments have been described above in detail, it will be understood that numerous modifications might be resorted to without departing from the scope of the invention as defined in the specification.

We claim:

1. A dichroic glass composition consisting essentially of 65 to 75% $SiO_2$; 1 to 3% $Al_2O_3$; 8 to 13% CaO; 0.1 to 4% MgO; 11 to 15% $Na_2O$; 0.1 to 2% $K_2O$; 0.03 to 0.2% $Fe_2O_3$; 0.05 to 0.2% CoO and 0.05 to 0.6% total chromium oxides expressed as $Cr_2O_3$ present as both $Cr_2O_3$ and $CrO_3$ with the latter being 0.03 to 0.09%.

2. A dichroic glass composition consisting essentially of a soda-lime-silica glass which contains the following dichroic colorants in the following amounts:

| | Percent |
|---|---|
| Total chromium oxides expressed as $Cr_2O_3$ | 0.05–0.6 |
| $CrO_3$ | 0.03–0.09 |
| CoO | 0.05–0.2 |

3. A dichroic glass composition consisting essentially of 65 to 75% $SiO_2$; 1 to 3% $Al_2O_3$; 8 to 13% CaO; 0.1 to 4% MgO; 11 to 15% $Na_2O$; 0.1 to 2% $K_2O$; 0.03 to 0.2% $Fe_2O_3$; 0.05 to 0.2% CoO; and total chromium oxides expressed as $Cr_2O_3$ present as both $Cr_2O_3$ and $CrO_3$ is 0.05% to 0.6% wherein 0.037% to 0.082% is $CrO_3$.

4. The composition according to claim 3 wherein the total $Cr_2O_3$ ratio to CoO ratio is 1:1 to 5:1.

5. The composition according to claim 3 wherein the glass contains 0.5 to 2.0% BaO.

References Cited

UNITED STATES PATENTS

| 3,206,659 | 9/1965 | Goodman et al. | 106—47 XR |
| 3,291,621 | 12/1966 | Hagedorn | 106—52 |
| 3,332,790 | 7/1967 | Penberthy | 106—52 |

HELEN M. McCARTHY, Primary Examiner